(12) United States Patent
Zeng et al.

(10) Patent No.: US 11,089,539 B2
(45) Date of Patent: Aug. 10, 2021

(54) DATA PROCESSING METHOD, TERMINAL, AND BASE STATION

(71) Applicant: Huawei Technologies Co., Ltd., Shenzhen (CN)

(72) Inventors: Qinghai Zeng, Shanghai (CN); Hongping Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 48 days.

(21) Appl. No.: 16/728,202

(22) Filed: Dec. 27, 2019

(65) Prior Publication Data

US 2020/0137668 A1  Apr. 30, 2020

Related U.S. Application Data

(63) Continuation of application No. PCT/CN2018/088408, filed on May 25, 2018.

(30) Foreign Application Priority Data

Jun. 30, 2017  (CN) .......................... 201710524141.7

(51) Int. Cl.
*H04W 72/14* (2009.01)
*H04W 48/10* (2009.01)
(Continued)

(52) U.S. Cl.
CPC ......... *H04W 48/10* (2013.01); *H04W 56/005* (2013.01); *H04W 72/1268* (2013.01); *H04W 72/1289* (2013.01)

(58) Field of Classification Search
None
See application file for complete search history.

(56) References Cited

U.S. PATENT DOCUMENTS

2012/0302240 A1\* 11/2012 Tamaki ............. H04W 36/0016
455/436
2013/0337795 A1  12/2013 Falconetti et al.
(Continued)

FOREIGN PATENT DOCUMENTS

CN      1498463 A    5/2004
CN    101998640 A    3/2011
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)," 3GPP TS 36.300 V10.0.0, Jun. 2010, 183 pages.
(Continued)

*Primary Examiner* — Brandon M Renner
(74) *Attorney, Agent, or Firm* — Slater Matsil, LLP

(57) ABSTRACT

A method includes: a terminal obtains a downlink reference for uplink transmission in a first cell of a first base station, the downlink reference is used to determine frequency information of an uplink carrier of the first cell; the terminal obtains uplink grant information in the first cell of the first base station, where the uplink grant information includes information about an uplink time-frequency resource on the uplink carrier of the first cell; and the terminal sends uplink data to the first base station on the uplink time-frequency resource by using the downlink reference.

20 Claims, 6 Drawing Sheets

(51) Int. Cl.
*H04W 56/00* (2009.01)
*H04W 72/12* (2009.01)

(56) References Cited

U.S. PATENT DOCUMENTS

| | | | |
|---|---|---|---|
| 2014/0004861 A1 | 1/2014 | Choi | |
| 2014/0078941 A1* | 3/2014 | Seo | H04L 5/1469 370/280 |
| 2014/0211762 A1* | 7/2014 | Bontu | H04W 36/38 370/332 |
| 2015/0223124 A1* | 8/2015 | Wang | H04W 24/08 455/436 |
| 2017/0142632 A1 | 5/2017 | Panchal et al. | |
| 2018/0115991 A1* | 4/2018 | Yang | H04W 16/14 |
| 2018/0139026 A1* | 5/2018 | Ahn | H04L 1/1692 |
| 2019/0327765 A1* | 10/2019 | Mukherjee | H04W 16/14 |
| 2020/0221464 A1* | 7/2020 | Nielsen | H04L 5/1469 |

FOREIGN PATENT DOCUMENTS

| | | |
|---|---|---|
| CN | 102802243 | 11/2012 |
| CN | 103312487 A | 9/2013 |
| CN | 105323776 A | 2/2016 |
| CN | 105940699 A | 9/2016 |
| CN | 106712914 A | 5/2017 |
| WO | 2017041718 A1 | 3/2017 |
| WO | 2017082780 A1 | 5/2017 |

OTHER PUBLICATIONS

"Enhancement to Small Cells for MTC," Agenda Item: 7.2.4.7, Source: Qualcomm Incoporated, Document for: Discussion/Decision, 3GPP TSG-RAN WG1 #72bis, R1-131401, Apr. 15-19, 2013, 6 pages.

* cited by examiner

DATA PROCESSING METHOD, TERMINAL, AND BASE STATION

CROSS-REFERENCE TO RELATED APPLICATIONS

This application is a continuation of International Application No. PCT/CN2018/088408, filed on May 25, 2018, which claims priority to Chinese Patent Application No. 201710524141.7, filed on Jun. 30, 2017. The disclosures of the aforementioned applications are hereby incorporated by reference in their entireties.

TECHNICAL FIELD

This application relates to the communications field, and in particular, to a data processing method, a terminal, and a base station.

BACKGROUND

To meet requirements of a mobile broadband on high-speed data transmission, people shift their focus onto a high frequency band over 6 GHz. A high frequency band has a large available bandwidth and can meet the requirements on high-speed data transmission.

However, a high frequency band signal attenuates rapidly in a propagation process, and in a case of omnidirectional antenna covers a very small area. To implement long-distance transmission, a high-frequency transmission system usually uses a beamforming technology to perform directional transmission, so as to extend a transmission distance. In combination with the available large bandwidth in the high-frequency band, extremely high-speed data transmission is implemented, and the requirements of the mobile broadband on high-speed data transmission are met.

In a downlink direction of the high-frequency transmission system, namely, a direction from a base station to a terminal, a relatively thin beam may be used to implement relatively long-distance transmission. However, because costs and a capability of the terminal are limited, usually a relatively thin beam cannot be generated in an uplink direction of the high-frequency transmission system, and a transmission distance comparable to that in the downlink cannot be implemented. Consequently, an uplink coverage area of the high-frequency transmission system is smaller than a downlink coverage area.

SUMMARY

Embodiments of this application provide a data processing method, a base station, and a terminal, to increase an uplink coverage area of a high-frequency transmission system.

According to a first aspect, an embodiment of this application provides a data processing method, including: obtaining, by a terminal, a downlink reference for uplink transmission in a first cell of the first base station, where the downlink reference is information about a downlink carrier of a second cell of the second base station, a frequency of a downlink carrier of the first cell is higher than a frequency of the downlink carrier of the second cell, the downlink reference is used to synchronize, in the first cell, uplink data transceiving frequencies and/or uplink data transceiving times between the terminal and the first base station, and the downlink reference is further used to determine information about an uplink carrier of the first cell; then, when the terminal obtains uplink grant information that is sent by the first base station in the first cell, determining, by the terminal based on the uplink grant information, an uplink time-frequency resource of uplink data that is sent by the terminal on the uplink carrier of the first cell; and finally, in response to the uplink grant information, sending, by the terminal, the uplink data to the first base station by using the uplink time-frequency resource and the downlink reference.

In this embodiment of this application, a center frequency of the downlink carrier of the first cell of the first base station may be compared with that of the downlink carrier of the second cell of the second base station. That is, it may be determined that the center frequency of the downlink carrier of the first cell of the first base station is higher than the center frequency of the downlink carrier of the second cell of the second base station. A comparison manner is not limited herein. In addition, the information that is about the uplink carrier of the first cell of the first base station and that is determined based on the downlink reference may be a center frequency and a frequency bandwidth, provided that data can be uploaded based on the information about the uplink carrier. Specific information content is not limited herein. In actual application, the downlink reference includes various parameters of the downlink carrier of the second cell of the second base station. For example, the downlink reference includes at least the center frequency of the downlink carrier of the second cell of the second base station, a difference between the center frequency of the downlink carrier of the second cell of the second base station and a center frequency of an uplink carrier of the second cell of the second base station, a frequency bandwidth of the downlink carrier of the second cell of the second base station, and the like. In this case, the terminal determines the center frequency and the frequency bandwidth of the uplink carrier of the first cell based on the center frequency of the downlink carrier of the second cell of the second base station in the downlink reference, and the difference between the center frequency of the downlink carrier of the second cell of the second base station and the center frequency of the uplink carrier of the second cell of the second base station in the downlink reference; and determines uplink and downlink data transceiving frequencies and uplink and downlink data transceiving times of the second cell of the second base station based on the center frequency of the downlink carrier of the second cell of the second base station. The uplink data transceiving frequency of the second cell is used as the uplink data transceiving frequency of the first cell of the first base station. A downlink data receiving time of the second cell of the second base station is used as a downlink data receiving time of the first cell of the first base station. The terminal may also determine the downlink data receiving time of the first cell of the first base station based on time synchronization information of the downlink carrier of the first cell of the first base station. In this embodiment, the uplink data transceiving frequency of the first cell of the first base station refers to a quantity of times that the terminal sends data to the first cell within a unit time.

In this embodiment of this application, when the first base station sends the uplink grant information to the terminal, an uplink subframe that is of the terminal and that is corresponding to the uplink grant information carried in a downlink subframe sent by the first base station is determined between the first base station and the terminal. Similarly, when the terminal sends the uplink data to the first base station, a downlink subframe that is of the first base station and that is corresponding to an uplink subframe sent by the terminal is also determined between the terminal and the first base station. However, a correspondence between a downlink subframe and an uplink subframe may be determined between the first base station and the terminal by using a protocol agreement or may be carried in real time in the uplink grant information or the uplink data. A specific implementation is not limited herein. In addition, a length of an uplink subframe of the first cell is greater than or equal to that of a downlink subframe of the first cell, and the uplink subframe and the downlink subframe usually may have an integer multiple relationship.

In this embodiment, when the first base station sends the uplink grant information to the terminal, an uplink subframe of the terminal that is corresponding to the uplink grant information carried in a downlink subframe sent by the first base station is determined between the first base station and the terminal. Similarly, when the terminal sends the uplink data to the first base station, a downlink subframe of the first base station that is corresponding to an uplink subframe sent by the terminal is also determined between the terminal and the first base station. However, a correspondence between a downlink subframe and an uplink subframe may be determined between the first base station and the terminal by using a protocol agreement or may be carried in real time in the uplink grant information or the uplink data. A specific implementation is not limited herein. In addition, a length of an uplink subframe of the first cell is greater than or equal to that of a downlink subframe of the first cell, and the uplink subframe and the downlink subframe usually may have an integer multiple relationship.

In this embodiment of this application, the first cell of the first base station determines, by using the information about the downlink carrier of the second cell of the second base station as the downlink reference, the information about the uplink carrier on which the terminal sends the uplink data in the first cell of the first base station, determines the downlink data transceiving frequency of the second cell of the second base station as the uplink data transceiving frequency between the terminal and the first base station, and determines the downlink data transceiving time of the second cell of the second base station as the uplink data transceiving time between the terminal and the first base station. The center frequency of the downlink carrier of the second cell of the second base station is lower than the center frequency of the downlink carrier of the first cell of the first base station, that is, the center frequency of the uplink carrier of the first cell of the first base station is lower than that of the downlink carrier of the first cell of the first base station. In addition, the uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network.

Optionally, the terminal obtains system information of the first cell of the first base station, and then obtains the downlink reference of the first cell of the first base station from indication information of the system information.

In this embodiment of this application, the terminal obtains the system information of the first cell of the first base station in manners including but not limited to the following:

In a possible implementation, the terminal detects a downlink high-frequency beam that is of the first cell of the first base station and that is broadcast or sent by the first base station. The downlink high-frequency beam carries the system information of the first cell of the first base station. Then, the terminal performs frequency synchronization with the downlink high-frequency beam based on a synchronization signal in the downlink high-frequency beam. Finally, after synchronizing with the downlink high-frequency beam, the terminal reads the system information that is of the first cell of the first base station and that is carried in the downlink high-frequency beam.

In another possible implementation, the terminal detects a broadcast message of the second cell of the second base station. The broadcast message carries the system information of the first cell of the first base station. Then, the terminal reads the broadcast message to obtain the system information of the first cell of the first base station.

In another possible implementation, the terminal establishes a communication connection to the second base station in the second cell (that is, the terminal accesses the second cell). Then, the terminal receives the system information that is of the first cell of the first base station and that is sent by the second base station.

In this implementation, the second base station can send the system information of the first cell of the first base station to the terminal only when a preset condition is met. In a process in which the terminal accesses the second cell and performs communication, the second base station configures the first cell of the first base station for the terminal when at least one of a measurement result reported by the terminal, a measurement result of an uplink signal of the terminal, and location information of the terminal meets the preset condition. In this case, the second base station sends the system information of the first cell of the first base station to the terminal. That at least one of the measurement result reported by the terminal, the measurement result of the uplink signal of the terminal, and the location information of the terminal meets the preset condition includes the following: The measurement result reported by the terminal is relatively poor, or the measurement result obtained by the second base station for the uplink signal of the terminal is relatively poor, or the terminal is relatively remote from the second cell of the second base station, or the like. A specific case is not limited herein.

In the technical solution provided in this embodiment of this application, the terminal obtains the system information of the first cell in a plurality of manners, so that flexibility of accessing the first cell by the terminal can be effectively improved.

Optionally, the indication information further includes identification information of the second cell of the second base station.

In this embodiment of this application, the indication information includes the identification information of the second cell of the second base station, so that a speed of determining, by the terminal, the information about the uplink carrier of the first cell of the first base station can be increased, and working efficiency is improved.

Optionally, the center frequency of the uplink carrier of the first cell is the same as the center frequency of the uplink carrier of the second cell.

In this embodiment of this application, the center frequency of the uplink carrier of the first cell is the same as the center frequency of the uplink carrier of the second cell, so that a process in which the terminal determines the information about the uplink carrier of the first cell of the first base station can be simplified.

Optionally, the terminal obtains time information (which may also be referred to as a timing advance), and the time information is used to indicate a timing advance of a moment when the terminal sends the uplink data relative to a start moment of the uplink time-frequency resource. In response to the uplink grant information, the terminal sends the uplink data to the first base station by using the uplink time-frequency resource, the downlink reference and the time information.

The time information is used to indicate the timing advance of a moment when the terminal sends the uplink data relative to the start moment of the uplink time-frequency resource. The terminal may determine the time information by using the following solution:

The terminal sends a random access preamble to the first base station. Then, after receiving the random access preamble, the first base station obtains a late time difference between an arrival time of a signal sent by the terminal and an arrival time expected by the first base station, and then uses the late time difference as the time information. Then, the first base station sends the timing advance to the terminal by using the downlink carrier of the first cell of the first base station. Finally, the terminal adjusts, based on the time information, a moment at which the terminal sends the uplink data. For example, the terminal sends the random access preamble based on a time determined by using the downlink reference. After receiving the random access preamble, the first base station finds that the random access preamble is 0.4 millisecond later than a receive time expected by the first base station, and then the first base station may determine that the timing advance is 0.4 millisecond. The first base station further sends information indicating the timing advance of 0.4 millisecond to the terminal, that is, the terminal needs to send the uplink data in advance of 0.4 millisecond.

In this embodiment of this application, data transmission consistency between the terminal and the first base station can be effectively improved by using the time information.

According to a second aspect, an embodiment of this application provides a data processing method, including: establishing, by a first base station, a communication connection to a terminal, where a downlink reference for uplink transmission in a first cell of the first base station is information about a downlink carrier of a second cell of a second base station, the downlink reference is used to synchronize, in the first cell, uplink data transceiving frequencies and/or uplink data transceiving times between the terminal and the first base station, the downlink reference is used to determine information about an uplink carrier of the first cell, and a frequency of a downlink carrier of the first cell is higher than a frequency of the downlink carrier of the second cell; sending, by the first base station, uplink grant information to the terminal, where the uplink grant information includes information about an uplink time-frequency resource on the uplink carrier of the first cell; and receiving, by the first base station, uplink data sent by the terminal, where the uplink data is sent by the terminal to the first base station by using the uplink time-frequency resource and the downlink reference.

In this embodiment of this application, a center frequency of the downlink carrier of the first cell of the first base station may be compared with that of the downlink carrier of the second cell of the second base station. That is, it may be determined that a center frequency of the downlink carrier of the first cell of the first base station is higher than a center frequency of the downlink carrier of the second cell of the second base station. A comparison manner is not limited herein. In addition, the information that is about the uplink carrier of the first cell of the first base station and that is determined based on the downlink reference may be a center frequency and a frequency bandwidth, provided that data can be uploaded based on the information about the uplink carrier. Specific information content is not limited herein. In actual application, the downlink reference includes various parameters of the downlink carrier of the second cell of the second base station. For example, the downlink reference includes at least the center frequency of the downlink carrier of the second cell of the second base station, a difference between the center frequency of the downlink carrier of the second cell of the second base station and a center frequency of an uplink carrier of the second cell of the second base station, a frequency bandwidth of the downlink carrier of the second cell of the second base station, and the like. In this case, the terminal determines the center frequency and the frequency bandwidth of the uplink carrier of the first cell based on the center frequency of the downlink carrier of the second cell of the second base station in the downlink reference, and the difference between the center frequency of the downlink carrier of the second cell of the second base station and the center frequency of the uplink carrier of the second cell of the second base station in the downlink reference; and determines uplink and downlink data transceiving frequencies and uplink and downlink data transceiving times of the second cell of the second base station based on the center frequency of the downlink carrier of the second cell of the second base station. The uplink data transceiving frequency of the second cell is used as the uplink data transceiving frequency of the first cell of the first base station. A downlink data receiving time of the second cell of the second base station is used as a downlink data receiving time of the first cell of the first base station. In addition, the terminal may further determine the downlink data receiving time of the first cell of the first base station based on time synchronization information of the downlink carrier of the first cell of the first base station. In this embodiment, the uplink data transceiving frequency of the first cell of the first base station refers to a quantity of times that the terminal sends data to the first cell within a unit time.

In this embodiment of this application, when the first base station sends the uplink grant information to the terminal, an uplink subframe of the terminal that is corresponding to the uplink grant information carried in a downlink subframe sent by the first base station is determined between the first base station and the terminal. For example, a number of the uplink subframe is a number of the downlink subframe plus 4. Similarly, when the terminal sends the uplink data to the first base station, a downlink subframe of the first base station that is corresponding to an uplink subframe sent by the terminal is also determined between the terminal and the first base station. However, a correspondence between a downlink subframe and an uplink subframe may be determined between the first base station and the terminal by using a protocol agreement or may be carried in real time in the uplink grant information or the uplink data. A specific implementation is not limited herein. In addition, a length of an uplink subframe of the first cell is greater than or equal to that of a downlink subframe of the first cell, and the uplink subframe and the downlink subframe usually may have an integer multiple relationship.

In this embodiment of this application, the first cell of the first base station determines, by using the downlink carrier of the second cell of the second base station as the downlink reference, the center frequency and the frequency bandwidth that are of the uplink carrier on which the terminal sends the uplink data in the first cell of the first base station, determines the downlink data transceiving frequency of the second cell of the second base station as the uplink data transceiving frequency between the terminal and the first base station, and determines the downlink data transceiving time of the second cell of the second base station as the uplink data transceiving time between the terminal and the first base station. The center frequency of the downlink carrier of the second cell of the second base station is lower than the center frequency of the downlink carrier of the first cell of the first base station, that is, the center frequency of the uplink carrier of the first cell of the first base station is lower than that of the downlink carrier of the first cell of the first base station. In addition, the uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network.

Optionally, the center frequency of the uplink carrier of the first cell is the same as the center frequency of the uplink carrier of the second cell.

Optionally, after receiving the uplink data sent by the terminal, the first base station forwards the uplink data to a core network.

In this embodiment, the first base station forwards the uplink data to the core network in different manners based on different connection relationships between the first base station and the second base station. Specific cases include but are not limited to the following manners:

In a possible implementation, when the first base station is directly connected to the core network, the first base station directly sends the uplink data to the core network by using a first carrier. A center frequency of the first carrier is the same as the center frequency of the downlink carrier of the first cell of the first base station, and a frequency bandwidth of the first carrier is the same as a frequency bandwidth of the downlink carrier of the first cell of the first base station. Alternatively, a center frequency of the first carrier is the same as the center frequency of the uplink carrier of the first cell of the first base station, and a frequency bandwidth of the first carrier is the same as the frequency bandwidth of the uplink carrier of the first cell of the first base station. A specific implementation is not limited herein.

In another possible implementation, the first base station is connected to the core network by using the second base station, and the first base station and the second base station communicate with each other over a radio link using a second carrier that has a same center frequency and frequency bandwidth as those of the uplink carrier of the second cell of the second base station. In this case, the first base station sends the uplink data to the second base station by using the center frequency and the frequency bandwidth of the uplink carrier of the second cell of the second base station. Then, the second base station sends the uplink data to the core network by using the center frequency and the frequency bandwidth of the uplink carrier of the second cell of the second base station.

In another possible implementation, the first base station is connected to the core network by using the second base station, and the first base station and the second base station communicate with each other over a radio link using a third carrier that has a same center frequency and frequency bandwidth as those of the downlink carrier of the first cell of the first base station. In this case, the first base station sends the uplink data to the second base station by using the center frequency and the frequency bandwidth of the carrier. Then, the second base station sends the uplink data to the core network by using the center frequency and the frequency bandwidth of the uplink carrier of the second cell of the second base station.

According to a third aspect, an embodiment of this application provides a terminal, and the terminal has a function of implementing the terminal in the foregoing methods. The function may be implemented by hardware, or may be implemented by hardware executing corresponding software. The hardware or the software includes one or more modules corresponding to the function.

In a possible implementation, the terminal includes: an obtaining module, configured to obtain a downlink reference for uplink transmission in a first cell of a first base station, where the downlink reference is information about a downlink carrier of a second cell of a second base station, the downlink reference is used to synchronize, in the first cell, uplink data transceiving frequencies and/or uplink data transceiving times between the terminal and the first base station, the downlink reference is used to determine frequency information of an uplink carrier of the first cell, and a frequency of a downlink carrier of the first cell is higher than a frequency of the downlink carrier of the second cell; and obtain uplink grant information in the first cell of the first base station, where the uplink grant information includes information about an uplink time-frequency resource on the uplink carrier of the first cell; and a sending module, configured to send uplink data to the first base station on the uplink time-frequency resource by using the downlink reference.

Optionally, the obtaining module includes: an obtaining unit, configured to obtain system information of the first cell of the first base station, where the system information includes indication information, and the indication information includes the downlink reference.

Optionally, the obtaining unit includes: a detection subunit, configured to detect a downlink high-frequency beam of the first cell of the first base station; a synchronization subunit, configured to synchronize with the downlink high-frequency beam; and a first obtaining subunit, configured to obtain the system information of the first cell from the downlink high-frequency beam.

Optionally, the obtaining unit includes: a second obtaining subunit, configured to obtain a broadcast message of the second cell of the second base station; and a reading subunit, configured to read the broadcast message to obtain the system information of the first cell.

Optionally, the obtaining unit includes: an establishment subunit, configured to establish a communication connection to the second base station; and a receiving subunit, configured to receive the system information of the first cell that is sent by the second base station.

In another possible implementation, the terminal includes: at least one processor, a memory, a transceiver apparatus, and a system bus, where the at least one processor, the memory, and the transceiver apparatus are coupled by using the system bus; the terminal communicates with a network side device by using the first transceiver apparatus; and the memory stores a program instruction, and the at least one processor invokes the program instruction stored in the memory to perform the operations of the terminal in the methods according to any one of the foregoing aspects.

According to a fourth aspect, an embodiment of this application provides a system chip, where the system chip is applied to a terminal, and the system chip includes: at least one processor, a memory, an interface circuit, and a bus, where the at least one processor, the memory, and the interface circuit are coupled by using the bus; and the system chip interacts with the terminal by using the interface circuit; and the memory stores a program instruction, and the at least one processor invokes the program instruction stored in the memory to perform the operations of the terminal in the foregoing methods.

According to a fifth aspect, an embodiment of this application provides a first base station, where the first base station has a function of implementing the first base station in the foregoing methods. The function may be implemented by hardware, or may be implemented by hardware executing corresponding software. The hardware or the software includes one or more modules corresponding to the function.

In a possible implementation, the first base station includes: an establishment module, configured to establish a communication connection to a terminal, where a downlink reference for uplink transmission in a first cell of the first base station is information about a downlink carrier of a second cell of a second base station, the downlink reference is used to synchronize, in the first cell, uplink data transceiving frequencies and/or uplink data transceiving times between the terminal and the first base station, the downlink reference is used to determine information about an uplink carrier of the first cell, and a frequency of a downlink carrier of the first cell is higher than a frequency of the downlink carrier of the second cell; a sending module, configured to send uplink grant information to the terminal, where the uplink grant information includes information about an uplink time-frequency resource on the uplink carrier of the first cell; and a receiving module, configured to receive uplink data sent by the terminal, where the uplink data is sent by the terminal to the first base station on the uplink time-frequency resource by using the downlink reference.

Optionally, the sending module is further configured to forward the uplink data to a core network.

Optionally, the sending module is further configured to send the uplink data to the second base station by using a first uplink carrier, so that the second base station forwards the uplink data to a core network, where a frequency of the first uplink carrier is the same as a frequency of an uplink carrier of the second base station.

Optionally, the sending module is further configured to send the uplink data to the second base station by using a second uplink carrier, so that the second base station forwards the uplink data to a core network, where a frequency of the second uplink carrier is greater than a frequency of an uplink carrier of the second base station.

In another possible implementation, the first base station includes: at least one processor, a memory, a first transceiver apparatus, a second transceiver apparatus, and a system bus, where the at least one processor, the memory, the first transceiver apparatus, and the second transceiver apparatus are coupled by using the system bus; the first base station communicates with a network side device by using the first transceiver apparatus, and the first base station communicates with a terminal device by using the second transceiver apparatus; and the memory stores a program instruction, and the at least one processor invokes the program instruction stored in the memory to perform the operations of the first base station in the methods according to any one of the foregoing aspects.

According to a sixth aspect, an embodiment of this application provides a system chip, where the system chip is applied to a first base station, and the system chip includes: at least one processor, a memory, an interface circuit, and a bus, where the at least one processor, the memory, and the interface circuit are coupled by using the bus; and the system chip interacts with the first base station by using the interface circuit; and the memory stores a program instruction, and the at least one processor invokes the program instruction stored in the memory to perform the operations of the first base station in the foregoing methods.

According to a seventh aspect, an embodiment of this application provides a data processing method, including: sending, by a second base station, system information of a first cell of a first base station to a terminal, where the system information includes indication information, the indication information includes a downlink reference, the downlink reference is information about a downlink carrier of a second cell of the second base station, the downlink reference is used to synchronize, in the first cell, uplink data transceiving frequencies and/or uplink data transceiving times between the terminal and the first base station, the downlink reference is used to determine frequency information of an uplink carrier of the first cell, and a frequency of a downlink carrier of the first cell is higher than a frequency of the downlink carrier of the second cell; receiving, by the second base station, uplink data sent by the first base station, where the uplink data is sent by the terminal to the first base station on an uplink time-frequency resource on the uplink carrier of the first cell by using the downlink reference, and the uplink time-frequency resource on the uplink carrier of the first cell is included in uplink grant information that is sent by the first base station to the terminal; and sending, by the second base station, the uplink data to a core network.

In this embodiment of this application, the second base station sends the system information of the first cell of the first base station to the terminal, so that the terminal determines, by using the information about the downlink carrier of the second cell of the second base station as the downlink reference, a center frequency and a frequency bandwidth that are of the uplink carrier on which the terminal sends the uplink data in the first cell of the first base station, determines a downlink data transceiving frequency of the second cell of the second base station as the uplink data transceiving frequency between the terminal and the first base station, and determines a downlink data transceiving time of the second cell of the second base station as the uplink data transceiving time between the terminal and the first base station. The frequency of the downlink carrier of the second cell of the second base station is lower than the frequency of the downlink carrier of the first cell of the first base station, that is, the center frequency of the uplink carrier of the first cell of the first base station is lower than that of the downlink carrier of the first cell of the first base station. In addition, the uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network.

Optionally, the second base station sends the system information of the first cell of the first base station to the terminal in manners including but not limited to the following:

In a possible implementation, the second base station sends a broadcast message to the terminal, where the broadcast message includes the system information of the first cell of the first base station.

In another possible implementation, the second base station establishes a communication connection to the terminal; and the second base station sends the system information of the first cell of the first base station to the terminal.

In this embodiment of this application, the second base station sends the system information of the first cell of the first base station to the terminal in a plurality of manners, so that flexibility of accessing the first cell by the terminal can be improved.

Optionally, the second base station receives, in manners including but not limited to the following, the uplink data sent by the first base station:

In a possible implementation, the second base station receives, by using a first uplink carrier, the uplink data sent by the first base station, where a frequency of the first uplink carrier is the same as a frequency of the uplink carrier of the first cell of the first base station.

In another possible implementation, the second base station receives, by using a second uplink carrier, the uplink data sent by the first base station, where a frequency of the second uplink carrier is the same as the frequency of the downlink carrier of the first cell of the first base station.

In this embodiment of this application, the second base station receives, in a plurality of manners, the uplink data sent by the first base station, thereby improving flexibility of data transmission between the second base station and the first base station.

According to an eighth aspect, an embodiment of this application provides a second base station, where the second base station has a function of implementing the second base station in the foregoing methods. The function may be implemented by hardware, or may be implemented by hardware executing corresponding software. The hardware or the software includes one or more modules corresponding to the function.

In a possible implementation, the second base station includes: a sending module, configured to send system information of a first cell of a first base station to a terminal, where the system information includes indication information, the indication information includes a downlink reference, the downlink reference is information about a downlink carrier of a second cell of the second base station, the downlink reference is used to synchronize, in the first cell, uplink data transceiving frequencies and/or uplink data transceiving times between the terminal and the first base station, the downlink reference is used to determine frequency information of an uplink carrier of the first cell, and a frequency of a downlink carrier of the first cell is higher than a frequency of the downlink carrier of the second cell; and a receiving module, configured to receive uplink data sent by the first base station, where the uplink data is sent by the terminal to the first base station on an uplink time-frequency resource on the uplink carrier of the first cell by using the downlink reference, and the uplink time-frequency resource on the uplink carrier of the first cell is included in uplink grant information that is sent by the first base station to the terminal.

The sending module is configured to send the uplink data to a core network.

Optionally, the sending module includes: a first sending unit, configured to send a broadcast message to the terminal, where the broadcast message includes the system information of the first cell of the first base station.

Optionally, the sending module includes: an establishment unit, configured to establish a communication connection to the terminal; and a second sending unit, configured to send the system information of the first cell of the first base station to the terminal.

Optionally, the receiving module includes: a first receiving unit, configured to receive, by using a first uplink carrier, the uplink data sent by the first base station, where a frequency of the first uplink carrier is the same as a frequency of the uplink carrier of the first cell of the first base station.

Optionally, the receiving module includes: a second receiving unit, configured to receive, by using a second uplink carrier, the uplink data sent by the first base station, where a frequency of the second uplink carrier is the same as the frequency of the downlink carrier of the first cell of the first base station.

In another possible implementation, the second base station includes: at least one processor, a memory, a first transceiver apparatus, a second transceiver apparatus, and a system bus, where the at least one processor, the memory, the first transceiver apparatus, and the second transceiver apparatus are coupled by using the system bus; the second base station communicates with a network side device by using the first transceiver apparatus, and the second base station communicates with a terminal device by using the second transceiver apparatus; and the memory stores a program instruction, and the at least one processor invokes the program instruction stored in the memory to perform the operations of the second base station in the foregoing methods.

According to an ninth aspect, an embodiment of this application provides a system chip, where the system chip is applied to a second base station, and the system chip includes: at least one processor, a memory, an interface circuit, and a bus, where the at least one processor, the memory, and the interface circuit are coupled by using the bus; and the system chip interacts with the second base station by using the interface circuit; and the memory stores a program instruction, and the at least one processor invokes the program instruction stored in the memory to perform the operations of the second base station in the foregoing methods.

According to a tenth aspect, an embodiment of this application provides a computer-readable storage medium including an instruction. When the instruction is run on a computer, the computer performs the foregoing methods.

According to an eleventh aspect, an embodiment of this application provides a computer program product including an instruction. When the computer program product is run on a computer, the computer performs the foregoing methods.

It may be learned from the foregoing technical solutions that the embodiments of this application have the following advantages: The first cell of the first base station determines, by using the downlink carrier of the second cell of the second base station as the downlink reference, the center frequency and the frequency bandwidth that are of the uplink carrier on which the terminal sends the uplink data in the first cell of the first base station, determines the downlink data transceiving frequency of the second cell of the second base station as the uplink data transceiving frequency between the terminal and the first base station, and determines the downlink data transceiving time of the second cell of the second base station as the uplink data transceiving time between the terminal and the first base station. The center frequency of the downlink carrier of the second cell of the second base station is lower than the center frequency of the downlink carrier of the first cell of the first base station, that is, the center frequency of the uplink carrier of the first cell of the first base station is lower than that of the downlink carrier of the first cell of the first base station. In addition, the uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of the high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network.

DETAILED DESCRIPTION OF ILLUSTRATIVE EMBODIMENTS

Embodiments of this application provide a data processing method, a base station, and a terminal, to increase an uplink coverage area of a high-frequency transmission system.

In the specification, claims, and accompanying drawings of this application, the terms "first", "second", "third", "fourth", and so on (if any) are intended to distinguish between similar objects but do not necessarily indicate a specific order or sequence. It should be understood that the terms used in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
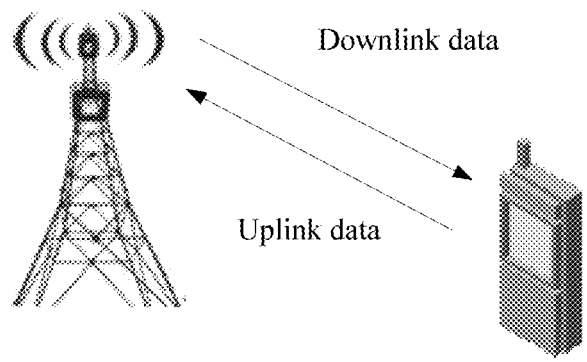
FIG. 1 is a schematic architecture diagram of a high-frequency transmission system.

To meet requirements of a mobile broadband on high-speed data transmission, people shift their focus onto a high frequency band over 6 GHz. A high frequency band has a large available bandwidth and can meet the requirements on high-speed data transmission. However, a high frequency band signal attenuates rapidly in a propagation process, and in a case of omnidirectional antenna, covers a very small area. As shown in FIG. 1, a high-frequency transmission system includes a base station and a terminal. To implement long-distance transmission, the base station usually uses a beamforming technology to perform directional transmission, so as to extend a transmission distance. In combination with the available large bandwidth in the high-frequency band, extremely high-speed data transmission is implemented, and the requirements of the mobile broadband on high-speed data transmission are met. In a downlink direction of the high-frequency transmission system, namely, a direction from the base station to the terminal, a relatively thin beam may be used to implement relatively long-distance transmission. However, because costs and a capability of the terminal are limited, usually a relatively thin beam cannot be generated in an uplink direction of the high-frequency transmission system, and a transmission distance comparable to that in the downlink cannot be implemented. Consequently, an uplink coverage area of the high-frequency transmission system is smaller than a downlink coverage area.

To resolve this problem, the embodiments of this application provide the following technical solution: A terminal obtains a downlink reference for uplink transmission in a first cell of a first base station, where the downlink reference is information about a downlink carrier of a second cell of a second base station, and a frequency of a downlink carrier of the first cell is higher than a frequency of the downlink carrier of the second cell. The downlink reference is used to synchronize, in the first cell, uplink data transceiving frequencies and/or uplink data transceiving times between the terminal and the first base station, and the downlink reference is further used to determine information about an uplink carrier of the first cell. Then, when the terminal obtains uplink grant information that is sent by the first base station in the first cell, the terminal determines, based on the uplink grant information, an uplink time-frequency resource of uplink data that is sent by the terminal on the uplink carrier of the first cell. Finally, in response to the uplink grant information, the terminal sends the uplink data to the first base station by using the uplink time-frequency resource and the downlink reference.

Figure 2:
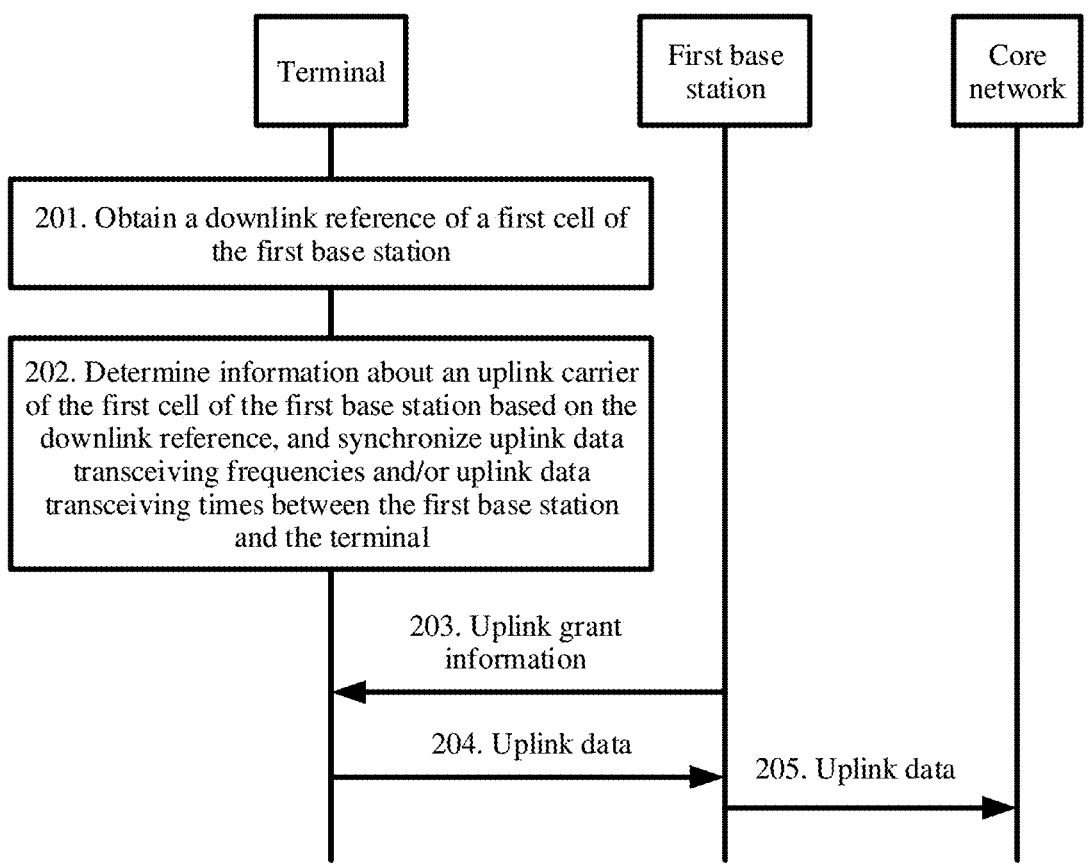
FIG. 2 is a schematic diagram of an embodiment of a data processing method according to an embodiment of this application.

Specifically, referring to FIG. 2, an embodiment of a data processing method according to an embodiment of this application includes the following steps.

201. A terminal obtains a downlink reference of a first cell of a first base station.

The terminal obtains a system information of the first cell of the first base station. The system information includes indication information. The indication information includes the downlink reference of the first cell. The downlink reference is information about a downlink carrier of a second cell of a second base station. For example, the downlink reference includes a center frequency of the downlink carrier of the second cell of the second base station, and a difference between the center frequency of the downlink carrier of the second cell of the second base station and a center frequency of an uplink carrier of the second cell of the second base station. A center frequency of a downlink carrier of the first cell of the first base station is greater than the center frequency of the downlink carrier of the second cell of the second base station.

For example, the center frequency of the downlink carrier of the first cell of the first base station may be 60 gigahertz GHz, the center frequency of the downlink carrier of the second cell of the second base station may be 400 megahertz MHz, and a difference between the center frequency of the downlink carrier of the second base station and the center frequency of the uplink carrier of the second cell of the second base station is 50 MHz. This is still used as an example in the following examples in this embodiment.

In this embodiment, the terminal obtains the system information of the first cell of the first base station in manners including but not limited to the following:

In a possible implementation, the terminal detects a downlink high-frequency beam that is of the first cell of the first base station and that is broadcast or sent by the first base station. The downlink high-frequency beam carries the system information of the first cell of the first base station. Then, the terminal performs frequency synchronization with the downlink high-frequency beam based on a synchronization signal in the downlink high-frequency beam. Finally, after synchronizing with the downlink high-frequency beam, the terminal reads the system information that is of the first cell of the first base station and that is carried in the downlink high-frequency beam.

In another possible implementation, the terminal detects a broadcast message of the second cell of the second base station. The broadcast message carries the system information of the first cell of the first base station. Then, the terminal reads the broadcast message to obtain the system information of the first cell of the first base station.

In another possible implementation, the terminal establishes a communication connection to the second base station in the second cell (that is, the terminal accesses the second cell). Then, the terminal receives the system information that is of the first cell of the first base station and that is sent by the second base station.

In this implementation, the second base station can send the system information of the first cell of the first base station to the terminal only when a preset condition is met. In a process in which the terminal accesses the second cell and performs communication, the second base station configures the first cell of the first base station for the terminal when at least one of a measurement result reported by the terminal, a measurement result of an uplink signal of the terminal, and location information of the terminal meets the preset condition. In this case, the second base station sends the system information of the first cell of the first base station to the terminal. That at least one of the measurement result reported by the terminal, the measurement result obtained by a core network for the uplink signal of the terminal, and the location information of the terminal meets the preset condition includes the following: The measurement result reported by the terminal is relatively poor, or the measurement result of the uplink signal of the terminal is relatively poor, or the terminal is relatively remote from the second cell of the second base station, or the like. A specific case is not limited herein.

202. The terminal determines information about an uplink carrier of the first cell of the first base station based on the downlink reference, and synchronizes, in the first cell based on the downlink reference, uplink data transceiving frequencies and/or uplink data transceiving times between the terminal and the first base station.

Figure 3:
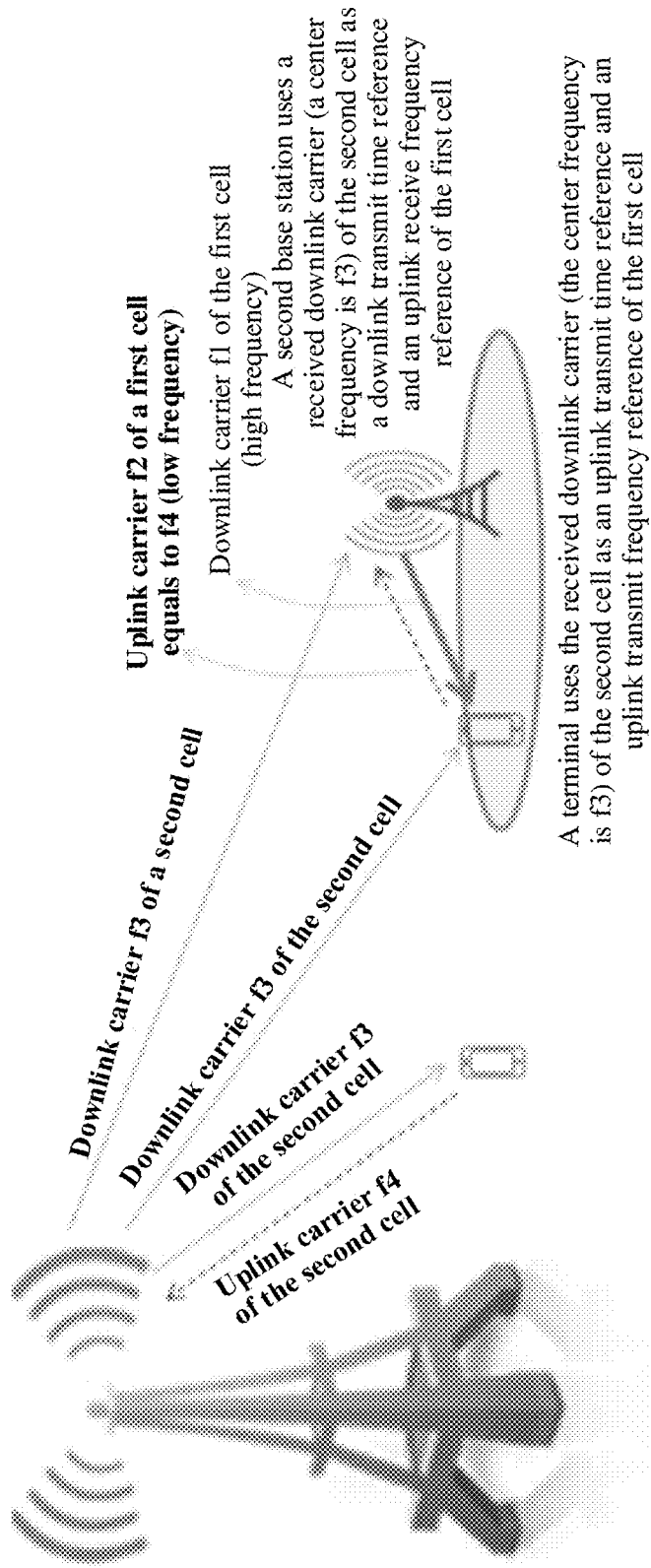
FIG. 3 is a schematic diagram of uplink and downlink carriers of a first cell and a second cell according to an embodiment of this application.

The terminal determines a center frequency and a frequency bandwidth of the uplink carrier of the first cell based on the center frequency of the downlink carrier of the second cell of the second base station and the difference between the center frequency of the downlink carrier of the second cell of the second base station and the center frequency of the uplink carrier of the second cell of the second base station in the downlink reference, and also determines uplink and downlink data transceiving frequencies and uplink and downlink data transceiving times of the second cell of the second base station based on the center frequency of the downlink carrier of the second cell of the second base station. The uplink data transceiving frequency and the uplink data transceiving time of the second cell are used as the uplink data transceiving frequency and the uplink data transceiving time of the first cell of the first base station. For example, as shown in FIG. 3, it is assumed that a center frequency of the downlink carrier of the first cell of the first base station is f1, where f1=60 GHz; a center frequency of the uplink carrier of the first cell of the first base station is f2; a center frequency of the downlink carrier of the second cell of the second base station is f3, where f3=400 MHz; and a center frequency of the uplink carrier of the second cell of the second base station is f4. The difference between the center frequency of the downlink carrier of the second cell of the second base station and the center frequency of the uplink carrier of the second cell of the second base station is 50 MHz, and the frequency bandwidth of the second cell of the second base station is 3 megabytes M. Then, the terminal may determine that the center frequency f4 of the uplink carrier of the second cell of the second base station is equal to 350 MHz (it is assumed that the center frequency of the uplink carrier of the second cell is lower than the center frequency of the downlink carrier of the second cell). In addition, the terminal uses the center frequency of the uplink carrier of the second cell as the center frequency of the uplink carrier of the first cell (that is, f2=f4). In this case, the center frequency f2 of the uplink carrier of the first cell of the first base station is equal to 350 MHz, and the frequency bandwidth of the uplink carrier of the first cell is 3 M. In addition, the terminal may further determine a downlink data receiving time of the first cell of the first base station based on a downlink data receiving time of the second cell of the second base station, or the terminal may determine a downlink data receiving time of the first cell of the first base station based on time synchronization information of the downlink carrier of the first cell of the first base station.

In this embodiment, the information about the uplink carrier of the first cell may be the center frequency and the frequency bandwidth of the uplink carrier, or may be other information, provided that data can be uploaded by using the uplink carrier. Specific information is not limited herein.

203. The first base station sends uplink grant information to the terminal, where the uplink grant information includes information about an uplink time-frequency resource on the uplink carrier of the first cell of the first base station.

After the first base station establishes a communication connection to the terminal (that is, the terminal accesses the first cell of the first base station), the first base station sends downlink data and the uplink grant information to the terminal. The uplink grant information is used to instruct the terminal to send uplink data to the first base station, and the uplink grant information includes the information about the uplink time-frequency resource on the uplink carrier of the first cell of the first base station.

In this embodiment, when the first base station sends the uplink grant information to the terminal, an uplink subframe that is of the terminal and that is corresponding to the uplink grant information carried in a downlink subframe sent by the first base station is determined between the first base station and the terminal. Similarly, when the terminal sends the uplink data to the first base station, a downlink subframe that is of the first base station and that is corresponding to an uplink subframe sent by the terminal is also determined between the terminal and the first base station. However, a correspondence between a downlink subframe and an uplink subframe may be determined between the first base station and the terminal by using a protocol agreement or may be carried in real time in the uplink grant information or the uplink data. A specific implementation is not limited herein. In addition, a length of an uplink subframe of the first cell is greater than or equal to that of a downlink subframe of the first cell, and the uplink subframe and the downlink subframe usually may have an integer multiple relationship.

Figure 4:
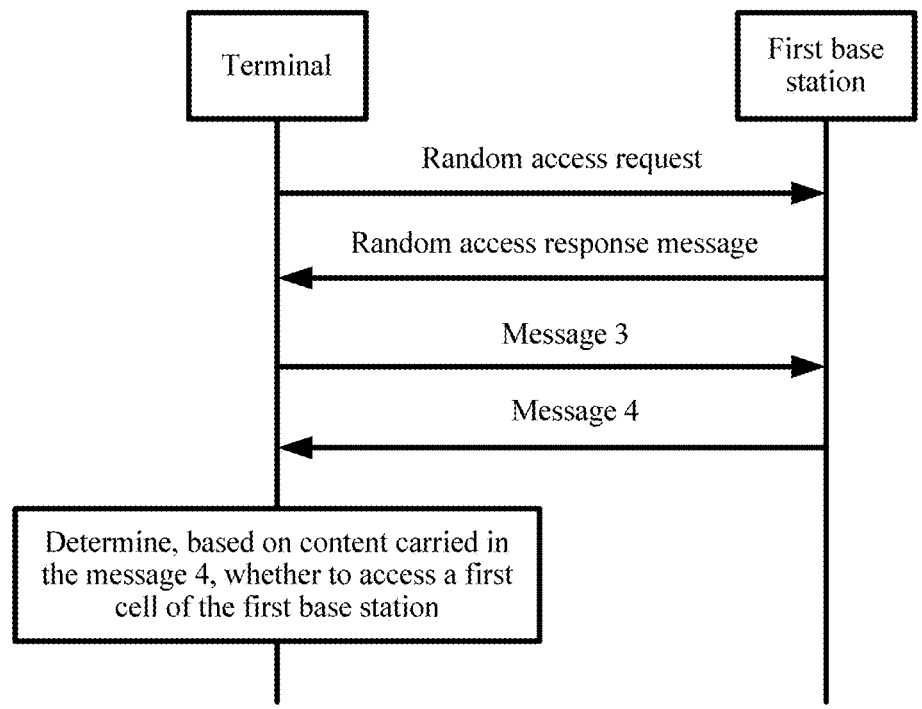
FIG. 4 is a schematic flowchart of accessing a first base station by a terminal according to an embodiment of this application.

In this embodiment, before the first base station sends the downlink data and the uplink grant information to the terminal, the terminal accesses the first cell of the first base station based on the system information of the first cell. A specific case is shown in FIG. 4.

Step 1: The terminal obtains the system information of the first cell, and obtains configuration information of an uplink random access resource, preamble configuration information, and the downlink reference from the system information.

Step 2: The terminal sends a random access request to the first base station by using the uplink random access resource and the downlink reference, where the random access request includes the preamble.

Step 3: The first base station sends a random access response message to the terminal, where the random access response message includes identification information of the preamble and uplink grant information for scheduling the terminal to perform uplink transmission.

Step 4: In response to the uplink grant information, the terminal sends a message 3 (the message 3 herein is a definition message of the uplink sending in a 3rd Generation Partnership Project (3rd generation partnership project, 3GPP for short)) to the first base station by using the uplink time-frequency resource indicated in the uplink grant information, where the message 3 includes identifier information of the terminal.

Step 5: The first base station sends a message 4 to the terminal (the message 4 herein is a definition message of the downlink sending in the 3GPP protocol), where the message 4 includes partial content of the message 3, such as the identification information of the terminal.

Step 6: The terminal determines whether the partial content that is in the message 3 and that is carried in the message 4 is correct. If the content is correct, the terminal determines that the terminal has accessed the first cell of the first base station.

In this embodiment, in a process of accessing the first cell of the first base station by the terminal, the first base station further performs a process such as security and dedicated radio bearer configuration on the terminal. For example, the first base station sends a radio resource control (RRC for short) connection configuration such as a security key and radio bearer setup to the terminal.

In this embodiment, when the first base station sends the downlink data and the uplink grant information to the terminal, downlink data transceiving frequencies and downlink data transceiving times between the first base station and the terminal also need to be synchronized. In this case, the first base station may use the downlink carrier of the first base station as a reference for synchronizing the downlink data transceiving frequencies and the downlink data transceiving times between the first base station and the terminal. Alternatively, the downlink carrier of the second cell of the second base station may be used as a reference for synchronizing the downlink data transceiving frequencies and the downlink data transceiving times between the first base station and the terminal. A specific manner is not limited herein.

204. The terminal sends uplink data to the first base station on the uplink time-frequency resource by using the downlink reference.

In response to the uplink grant information, the terminal modulates the uplink data on the uplink time-frequency resource based on the center frequency and the frequency bandwidth of the uplink carrier of the first cell, and then sends the uplink data to the first base station based on the uplink data transceiving frequency and/or the uplink data transceiving time that are/is synchronized based on the downlink reference.

In this embodiment, if a distance between the terminal and the first base station is greater than a preset threshold (that is, duration of data transmission between the terminal and the first base station exceeds a system requirement), the terminal needs to determine time information (which may be referred to as a timing advance) before sending the uplink data. The timing advance is used to indicate a timing advance of a moment when the terminal sends the uplink data relative to a start moment of the uplink time-frequency resource. The terminal may determine the timing advance by using the following solution:

The terminal sends a random access preamble to the first base station. Then, after receiving the random access preamble, the first base station obtains a late time difference between an arrival time of a signal sent by the terminal and an arrival time expected by the first base station, and then uses the late time difference as the timing advance. Then, the first base station sends the timing advance to the terminal by using the downlink carrier of the first cell of the first base station. Finally, the terminal adjusts, based on the timing advance, a moment at which the terminal sends the uplink data. For example, the terminal sends the random access preamble based on a time determined by using the downlink reference. After receiving the random access preamble, the first base station finds that the random access preamble is 0.4 millisecond later than a receive time expected by the first base station, and then the first base station may determine that the timing advance is 0.4 millisecond. The first base station further sends information indicating the timing advance of 0.4 millisecond to the terminal, that is, the terminal needs to send the uplink data in advance of 0.4 millisecond.

205. The first base station sends the uplink data to a core network.

After receiving the uplink data sent by the terminal, the first base station forwards the uplink data to the core network.

Figure 5:
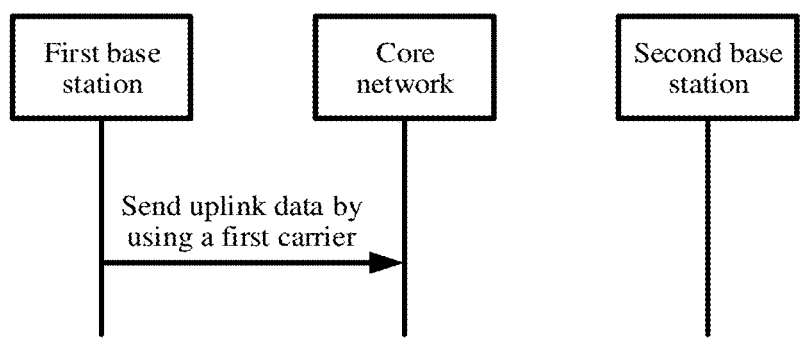
FIG. 5 is a schematic diagram of an embodiment in which a first base station sends uplink data to a core network according to an embodiment of this application.

In this embodiment, the first base station forwards the uplink data to the core network in different manners based on different connection relationships between the first base station and the second base station. Specific cases include but are not limited to the following manners:

In a possible implementation, as shown in FIG. 5, when the first base station is directly connected to the core network, the first base station directly sends the uplink data to the core network by using a first carrier. A center frequency of the first carrier is the same as the center frequency of the downlink carrier of the first cell of the first base station, and a frequency bandwidth of the first carrier is the same as a frequency bandwidth of the downlink carrier of the first cell of the first base station. Alternatively, a center frequency of the first carrier is the same as the center frequency of the uplink carrier of the first cell of the first base station, and a frequency bandwidth of the first carrier is the same as the frequency bandwidth of the uplink carrier of the first cell of the first base station. A specific implementation is not limited herein.

Figure 6:
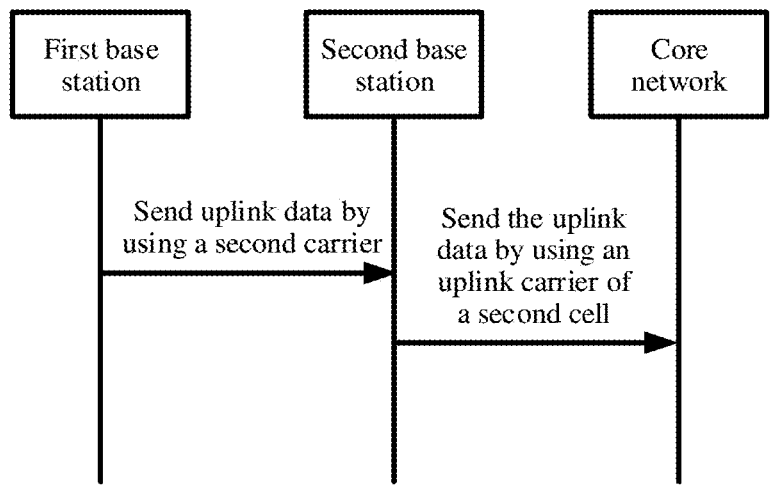
FIG. 6 is a schematic diagram of another embodiment in which a first base station sends uplink data to a core network according to an embodiment of this application.

In another possible implementation, as shown in FIG. 6, the first base station is connected to the core network by using the second base station, and the first base station and the second base station communicate with each other over a radio link using a second carrier that has a same center frequency and frequency bandwidth as those of the uplink carrier of the second cell of the second base station. In this case, the first base station sends the uplink data to the second base station by using the center frequency and the frequency bandwidth of the uplink carrier of the second cell of the second base station. Then, the second base station sends the uplink data to the core network by using the center frequency and the frequency bandwidth of the uplink carrier of the second cell of the second base station.

Figure 7:
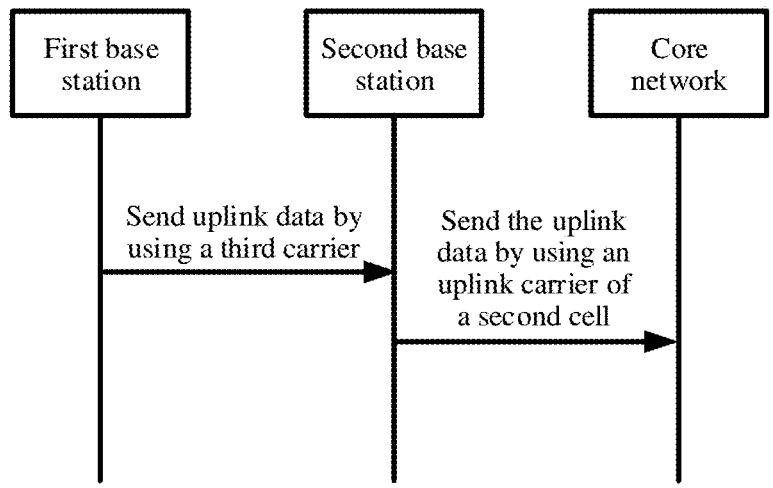
FIG. 7 is a schematic diagram of another embodiment in which a first base station sends uplink data to a core network according to an embodiment of this application.

In another possible implementation, as shown in FIG. 7, the first base station is connected to the core network by using the second base station, and the first base station and the second base station communicate with each other over a radio link using a third carrier that has a same center frequency and frequency bandwidth as those of the downlink carrier of the first cell of the first base station. In this case, the first base station sends the uplink data to the second base station by using the center frequency and the frequency bandwidth of the carrier. Then, the second base station sends the uplink data to the core network by using the center frequency and the frequency bandwidth of the uplink carrier of the second cell of the second base station.

In this embodiment, the first cell of the first base station determines, by using the downlink carrier of the second cell of the second base station as the downlink reference, the center frequency and the frequency bandwidth that are of the uplink carrier on which the terminal sends the uplink data in the first cell of the first base station, determines the downlink data transceiving frequency of the second cell of the second base station as the uplink data transceiving frequency between the terminal and the first base station, and determines the downlink data transceiving time of the second cell of the second base station as the uplink data transceiving time between the terminal and the first base station. The center frequency of the downlink carrier of the second cell of the second base station is lower than the center frequency of the downlink carrier of the first cell of the first base station, that is, the center frequency of the uplink carrier of the first cell of the first base station is lower than that of the downlink carrier of the first cell of the first base station. In addition, the uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of the high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network. The data processing method in this embodiment of this application is described above, and the terminal and the first base station in this embodiment of this application are described below.

Figure 8:
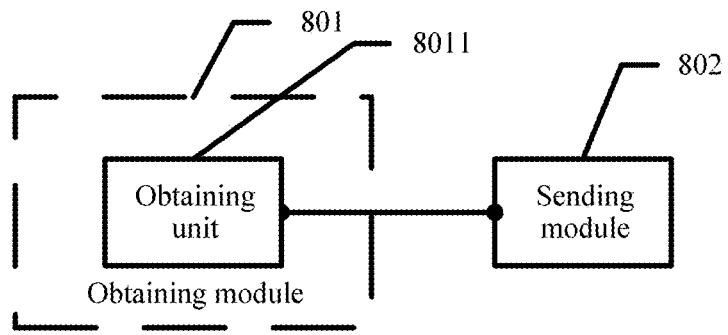
FIG. 8 is a schematic diagram of an embodiment of a terminal according to an embodiment of this application.

Specifically, referring to FIG. 8, a terminal in an embodiment of this application includes: an obtaining module 801, configured to obtain a downlink reference for uplink transmission in a first cell of a first base station, where the downlink reference is information about a downlink carrier of a second cell of a second base station, the downlink reference is used to synchronize, in the first cell, uplink data transceiving frequencies and/or uplink data transceiving times between the terminal and the first base station, the downlink reference is used to determine frequency information of an uplink carrier of the first cell, and a frequency of a downlink carrier of the first cell is higher than a frequency of the downlink carrier of the second cell; and obtain uplink grant information in the first cell of the first base station, where the uplink grant information includes information about an uplink time-frequency resource on the uplink carrier of the first cell; and a sending module 802, configured to send uplink data to the first base station on the uplink time-frequency resource by using the downlink reference.

Optionally, the obtaining module 801 includes: an obtaining unit 8011, configured to obtain system information of the first cell of the first base station, where the system information includes indication information, and the indication information includes the downlink reference.

Optionally, the obtaining unit 8011 includes: a detection subunit, configured to detect a downlink high-frequency beam of the first cell of the first base station; a synchronization subunit, configured to synchronize with the downlink high-frequency beam; and a first obtaining subunit, configured to obtain the system information of the first cell from the downlink high-frequency beam.

Optionally, the obtaining unit 8011 includes: a second obtaining subunit, configured to obtain a broadcast message of the second cell of the second base station; and a reading subunit, configured to read the broadcast message to obtain the system information of the first cell.

Optionally, the obtaining unit 8011 includes: an establishment subunit, configured to establish a communication connection to the second base station; and a receiving subunit, configured to receive the system information of the first cell that is sent by the second base station.

In this embodiment, the first cell of the first base station determines, by using the downlink carrier of the second cell of the second base station as the downlink reference, a center frequency and a frequency bandwidth that are of the uplink carrier on which the terminal sends the uplink data in the first cell of the first base station, determines a downlink data transceiving frequency of the second cell of the second base station as the uplink data transceiving frequency between the terminal and the first base station, and determines a downlink data transceiving time of the second cell of the second base station as the uplink data transceiving time between the terminal and the first base station. A center frequency of the downlink carrier of the second cell of the second base station is lower than a center frequency of the downlink carrier of the first cell of the first base station, that is, the center frequency of the uplink carrier of the first cell of the first base station is lower than that of the downlink carrier of the first cell of the first base station. In addition, the uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of the high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network.

Figure 9:
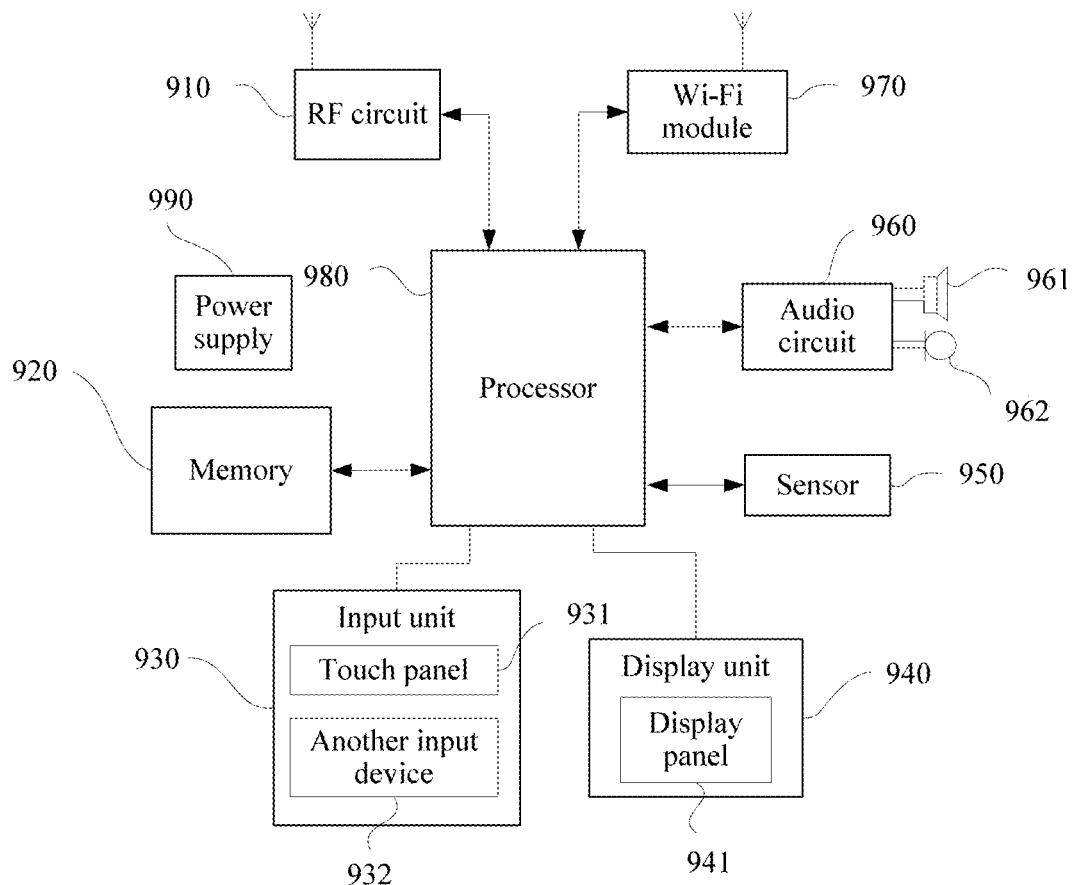
FIG. 9 is a schematic diagram of another embodiment of a terminal according to an embodiment of this application.

As shown in FIG. 9, an embodiment of this application further provides another terminal. For ease of description, only a part related to this embodiment of this application is illustrated. For specific technical details that are not disclosed, refer to the method part in the embodiments of this application. The terminal may be any terminal device including a mobile phone, a tablet computer, a personal digital assistant (personal digital assistant, PDA for short), a point of sale (point of sales, POS for short), a vehicle-mounted computer, or the like. For example, the terminal is a mobile phone.

FIG. 9 is a block diagram of a partial structure of a mobile phone related to the terminal according to this embodiment of this application. Referring to FIG. 9, the mobile phone includes components such as a radio frequency (radio frequency, RF for short) circuit 910, a memory 920, an input unit 930, a display unit 940, a sensor 950, an audio circuit 960, a wireless fidelity (wireless fidelity, Wi-Fi for short) module 970, a processor 980, and a power supply 990. A person skilled in the art may understand that a mobile phone structure shown in FIG. 9 does not constitute any limitation on the mobile phone, and the mobile phone may include more or fewer components than those shown in the figure, or combine some components, or have different component arrangements.

The components of the mobile phone are described in detail below with reference to FIG. 9.

The RF circuit 910 may be configured to receive and send signals in an information receiving and sending process or during a call. Particularly, after receiving downlink information from a base station, the RF circuit 910 sends the downlink information to the processor 980 for processing. In addition, the RF circuit 910 sends uplink data to the base station. Generally, the RF circuit 910 includes but is not limited to an antenna, at least one amplifier, a transceiver, a coupler, a low noise amplifier (LNA for short), a duplexer, and the like. In addition, the RF circuit 910 may further communicate with a network and another device through wireless communication. The wireless communication may use any communication standard or protocol, including but not limited to a global system for mobile communications (GSM for short), a general packet radio service (GPRS for short), code division multiple access (CDMA for short), wideband code division multiple access (WCDMA for short), long term evolution (LTE for short), an email, a short message service (SMS for short), and the like.

The memory 920 may be configured to store a software program and a module. The processor 980 runs the software program and the module that are stored in the memory 920, to perform various function applications and data processing of the mobile phone. The memory 920 may mainly include a program storage area and a data storage area. The program storage area may store an operating system, an application program required by at least one function (such as a sound playback function and an image display function), and the like. The data storage area may store data (such as audio data or an address book) created based on use of the mobile phone, and the like. In addition, the memory 920 may include a high-speed random access memory, and may further include a nonvolatile memory, for example, at least one magnetic disk storage device, a flash storage device, or another volatile solid-state storage device.

The input unit 930 may be configured to receive input numeral or character information, and generate a key signal input related to a user setting and function control of the mobile phone. Specifically, the input unit 930 may include a touch panel 931 and another input device 932. The touch panel 931, also referred to as a touchscreen, may collect a touch operation performed by a user on or near the touch panel 931 (such as an operation performed by the user on or near the touch panel 931 by using any suitable object or accessory such as a finger or a stylus), and drive a corresponding connection apparatus according to a preset program. Optionally, the touch panel 931 may include two parts: a touch detection apparatus and a touch controller. The touch detection apparatus detects a touch location of the user, detects a signal brought by a touch operation, and transfers the signal to the touch controller. The touch controller receives touch information from the touch detection apparatus and converts the touch information into touch point coordinates, and then sends the touch point coordinates to the processor 980, and the touch controller can receive and execute a command sent by the processor 980. In addition, the touch panel 931 may be of a resistive type, a capacitive type, an infrared type, a surface acoustic wave type, or the like. In addition to the touch panel 931, the input unit 930 may further include another input device 932. Specifically, the another input device 932 may include, but is not limited to, one or more of a physical keyboard, a function key (such as a volume control key or an on/off key), a trackball, a mouse, a joystick, and the like.

The display unit 940 may be configured to display information entered by a user or information provided for a user and various menus of the mobile phone. The display unit 940 may include a display panel 941. Optionally, the display panel 941 may be configured by using a liquid crystal display (LCD for short), an organic light-emitting diode (OLED for short), or the like. Further, the touch panel 931 may cover the display panel 941. After detecting a touch operation on or near the touch panel 931, the touch panel 931 transfers the touch operation to the processor 980, to determine a type of a touch event. Subsequently, the processor 980 provides a corresponding visual output on the display panel 941 based on the type of the touch event. In FIG. 9, the touch panel 931 and the display panel 941 are used as two separate components to implement input and input functions of the mobile phone; however, in some embodiments, the touch panel 931 and the display panel 941 may be integrated to implement the input and output functions of the mobile phone.

The mobile phone may further include at least one sensor 950, such as an optical sensor, a motion sensor, and another sensor. Specifically, the optical sensor may include an ambient light sensor and a proximity sensor. The ambient light sensor may adjust luminance of the display panel 941 based on brightness of an ambient light. The proximity sensor may turn off the display panel 941 and/or backlight when the mobile phone is moved to an ear. As one type of motion sensor, an accelerometer sensor may detect magnitude of accelerations in all directions (usually on three axes), may detect magnitude and a direction of the gravity when the mobile phone is still, and may be applied to an application that recognizes a posture of the mobile phone (for example, switching between landscape orientation and portrait orientation, a related game, and magnetometer posture calibration), a function related to vibration recognition (such as a pedometer and a knock), and the like. Other sensors such as a gyroscope, a barometer, a hygrometer, a thermometer, and an infrared sensor that may be further configured in the mobile phone are not described herein.

The audio circuit 960, a speaker 961, and a microphone 962 may provide audio interfaces between the user and the mobile phone. The audio circuit 960 may convert received audio data into an electrical signal and transmit the electrical signal to the speaker 961; and the speaker 961 converts the electrical signal into a sound signal for output. In addition, the microphone 962 converts a collected sound signal into an electrical signal; the audio circuit 960 receives the electrical signal, converts the electrical signal into audio data, and then outputs the audio data to the processor 980; and the processor 980 processes the audio data and then sends the audio data to, for example, another mobile phone through the RF circuit 910, or outputs the audio data to the memory 920 for further processing.

Wi-Fi belongs to a short-distance wireless transmission technology. The mobile phone may help, by using the Wi-Fi module 970, the user receive and send an email, browse a web page, access streaming media, and the like. The Wi-Fi module 970 provides wireless broadband internet access for the user. Although FIG. 9 shows the Wi-Fi module 970, it may be understood that the Wi-Fi module 970 is not a mandatory component of the mobile phone, and the Wi-Fi module 970 may be omitted as required, provided that the scope of the essence of this application is not changed.

The processor 980 is a control center of the mobile phone, and connects all parts of the entire mobile phone by using various interfaces and lines. By running or executing the software program and/or the module stored in the memory 920 and invoking the data stored in the memory 920, the processor 980 performs various functions and/or data processing of the mobile phone, to perform overall monitoring on the mobile phone. Optionally, the processor 980 may include one or more processing units. Preferably, the processor 980 may integrate an application processor and a modem processor. The application processor mainly processes the operating system, a user interface, the application program, and the like. The modem processor mainly processes wireless communication. It may be understood that, alternatively, the modem processor may not be integrated into the processor 980.

The mobile phone further includes the power supply 990 (such as a battery) for supplying power to each component. Preferably, the power supply may be logically connected to the processor 980 by using a power management system, thereby implementing functions such as charging, discharging, and power consumption management by using the power management system.

Although not shown, the mobile phone may further include a camera, a Bluetooth module, and the like. Details are not described herein.

In this embodiment, the processor 980 included in the mobile phone further has the following functions: obtaining a downlink reference for uplink transmission in a first cell of a first base station, where the downlink reference is information about downlink carrier of a second cell of a second base station, the downlink reference is used to synchronize at least one of a data transceiving frequency and a data transceiving time between the terminal and the first base station, and a center frequency of a downlink carrier of the first cell is higher than a center frequency of the downlink carrier of the second cell; obtaining uplink grant information of the first base station, where the uplink grant information includes configuration information of an uplink auxiliary resource; and in response to the uplink grant information, sending uplink data to the first base station by using the uplink auxiliary resource and the downlink reference.

In this embodiment, the first cell of the first base station determines, by using the downlink carrier of the second cell of the second base station as the downlink reference, a center frequency and a frequency bandwidth that are of an uplink carrier on which the terminal sends the uplink data in the first cell of the first base station, determines a downlink data transceiving frequency of the second cell of the second base station as an uplink data transceiving frequency between the terminal and the first base station, and determines a downlink data transceiving time of the second cell of the second base station as an uplink data transceiving time between the terminal and the first base station. The center frequency of the downlink carrier of the second cell of the second base station is lower than the center frequency of the downlink carrier of the first cell of the first base station, that is, the center frequency of the uplink carrier of the first cell of the first base station is lower than that of the downlink carrier of the first cell of the first base station. In addition, an uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of the high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network.

Figure 10:
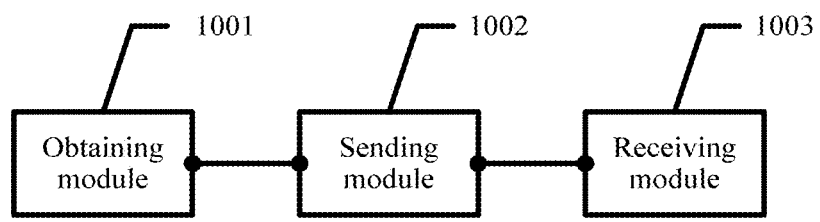
FIG. 10 is a schematic diagram of an embodiment of a first base station according to an embodiment of this application.

Specifically, referring to FIG. 10, an embodiment of a first base station in the embodiments of this application includes: an establishment module 1001, configured to establish a communication connection to a terminal, where a downlink reference for uplink transmission in a first cell of the first base station is information about a downlink carrier of a second cell of a second base station, the downlink reference is used to synchronize, in the first cell, uplink data transceiving frequencies and/or uplink data transceiving times between the terminal and the first base station, the downlink reference is used to determine information about an uplink carrier of the first cell, and a frequency of a downlink carrier of the first cell is higher than a frequency of the downlink carrier of the second cell; a sending module 1002, configured to send uplink grant information to the terminal, where the uplink grant information includes information about an uplink time-frequency resource on the uplink carrier of the first cell; and a receiving module 1003, configured to receive uplink data sent by the terminal, where the uplink data is sent by the terminal to the first base station on the uplink time-frequency resource by using the downlink reference.

Optionally, the sending module 1002 is further configured to forward the uplink data to a core network.

Optionally, the sending module 1002 is further configured to send the uplink data to the second base station by using a first uplink carrier, so that the second base station forwards the uplink data to a core network, where a frequency of the first uplink carrier is the same as a frequency of an uplink carrier of the second base station.

Optionally, the sending module 1002 is further configured to send the uplink data to the second base station by using a second uplink carrier, so that the second base station forwards the uplink data to a core network, where a frequency of the second uplink carrier is greater than a frequency of an uplink carrier of the second base station. In this embodiment, the first cell of the first base station determines, by using the downlink carrier of the second cell of the second base station as the downlink reference, a center frequency and a frequency bandwidth that are of the uplink carrier on which the terminal sends the uplink data in the first cell of the first base station, determines a downlink data transceiving frequency of the second cell of the second base station as the uplink data transceiving frequency between the terminal and the first base station, and determines a downlink data transceiving time of the second cell of the second base station as the uplink data transceiving time between the terminal and the first base station. A center frequency of the downlink carrier of the second cell of the second base station is lower than a center frequency of the downlink carrier of the first cell of the first base station, that is, the center frequency of the uplink carrier of the first cell of the first base station is lower than that of the downlink carrier of the first cell of the first base station. In addition, the uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of the high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network.

Figure 11:
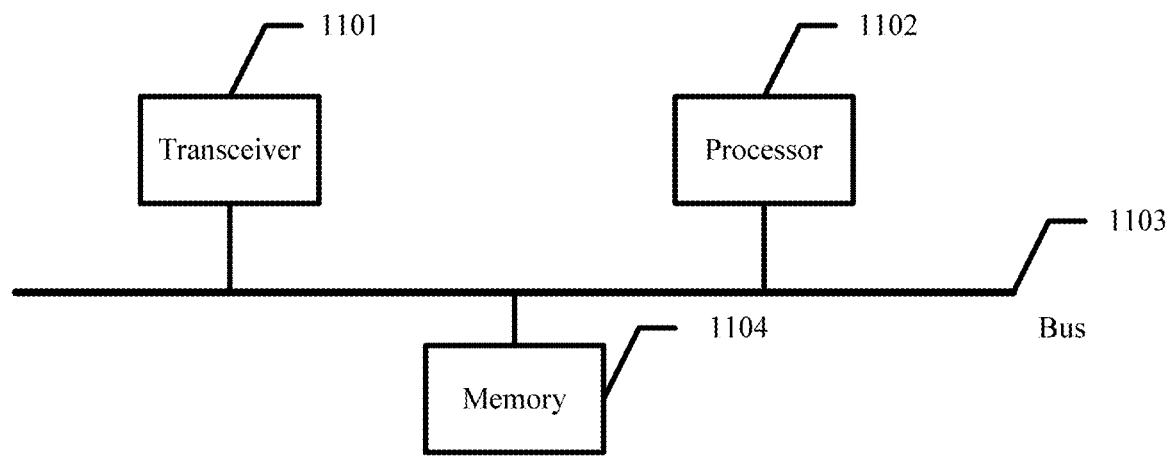
FIG. 11 is a schematic diagram of another embodiment of a first base station according to an embodiment of this application.

Specifically, referring to FIG. 11, another embodiment of a first base station in the embodiments of this application includes: a transceiver 1101, a processor 1102, and a bus 1103; where the transceiver 1101 is connected to the processor 1102 by using the bus 1103.

The bus 1103 may be a peripheral component interconnect (PCI for short) bus, an extended industry standard architecture (EISA for short) bus, or the like. The bus may be classified into an address bus, a data bus, a control bus, and the like. For ease of representation, only one thick line is used to represent the bus in FIG. 11, but this does not mean that there is only one bus or only one type of bus.

The processor 1102 may be a central processing unit (CPU for short), a network processor (network processor, NP for short), or a combination of a CPU and an NP.

The processor 1102 may further include a hardware chip. The hardware chip may be an application-specific integrated circuit (ASIC for short), a programmable logic device (PLD for short), or a combination thereof. The PLD may be a complex programmable logic device (CPLD for short), a field-programmable gate array (field-programmable gate array, FPGA for short), generic array logic (GAL for short), or any combination thereof.

Referring to FIG. 11, the first base station may further include a memory 1104. The memory 1104 may include a volatile memory, for example, a random access memory (random-access memory, RAM for short). Alternatively, the memory may include a non-volatile memory, for example, a flash memory, a hard disk drive (HDD for short), or a solid-state drive (SSD for short). Alternatively, the memory 1104 may include a combination of the foregoing types of memories.

Optionally, the memory 1104 may be further configured to store a program instruction. The processor 1102 invokes the program instruction stored in the memory 1104, and can perform one or more steps in the embodiments shown in FIG. 2 to FIG. 7, or an optional implementation in the embodiments shown in FIG. 2 to FIG. 7, to implement a function of behavior of the first base station in the foregoing method.

The processor 1102 performs the following step: establishing a communication connection to a terminal, where a downlink reference for uplink transmission in a first cell of the first base station is information about a downlink carrier of a second cell of a second base station, the downlink reference is used to synchronize, in the first cell, uplink data transceiving frequencies and/or uplink data transceiving times between the terminal and the first base station, the downlink reference is used to determine information about an uplink carrier of the first cell, and a frequency of a downlink carrier of the first cell is higher than a frequency of the downlink carrier of the second cell.

The transceiver 1101 performs the following steps: sending uplink grant information to the terminal, where the uplink grant information includes information about an uplink time-frequency resource on the uplink carrier of the first cell; and receiving uplink data sent by the terminal, where the uplink data is sent by the terminal to the first base station on the uplink time-frequency resource by using the downlink reference.

In this embodiment, the transceiver 1101 performs the step of transceiving information by the first base station in the foregoing embodiment. The processor 1102 performs the step of processing the information by the first base station in the foregoing embodiment.

In this embodiment, the first cell of the first base station determines, by using the downlink carrier of the second cell of the second base station as the downlink reference, a center frequency and a frequency bandwidth that are of the uplink carrier on which the terminal sends the uplink data in the first cell of the first base station, determines a downlink data transceiving frequency of the second cell of the second base station as the uplink data transceiving frequency between the terminal and the first base station, and determines a downlink data transceiving time of the second cell of the second base station as the uplink data transceiving time between the terminal and the first base station. A center frequency of the downlink carrier of the second cell of the second base station is lower than a center frequency of the downlink carrier of the first cell of the first base station, that is, the center frequency of the uplink carrier of the first cell of the first base station is lower than that of the downlink carrier of the first cell of the first base station. In addition, the uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of the high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network.

Figure 12:
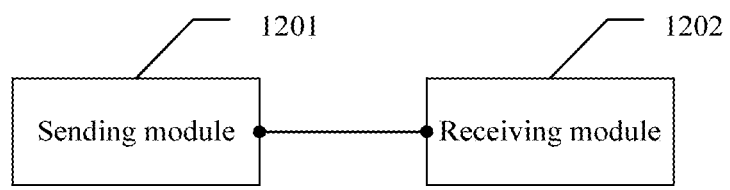
FIG. 12 is a schematic diagram of an embodiment of a second base station according to an embodiment of this application.

Specifically, referring to FIG. 12, an embodiment of the second base station in the embodiments of this application includes: a sending module 1201, configured to send system information of a first cell of a first base station to a terminal, where the system information includes indication information, the indication information includes a downlink reference, the downlink reference is information about a downlink carrier of a second cell of the second base station, the downlink reference is used to synchronize, in the first cell, uplink data transceiving frequencies and/or uplink data transceiving times between the terminal and the first base station, the downlink reference is used to determine frequency information of an uplink carrier of the first cell, and a frequency of a downlink carrier of the first cell is higher than a frequency of the downlink carrier of the second cell; and a receiving module 1202, configured to receive uplink data sent by the first base station, where the uplink data is sent by the terminal to the first base station on an uplink time-frequency resource on the uplink carrier of the first cell by using the downlink reference, and the uplink time-frequency resource on the uplink carrier of the first cell is included in uplink grant information that is sent by the first base station to the terminal.

The sending module 1201 is configured to send the uplink data to a core network.

Optionally, the sending module 1201 includes: a first sending unit, configured to send a broadcast message to the terminal, where the broadcast message includes the system information of the first cell of the first base station.

Optionally, the sending module 1201 includes: an establishment unit, configured to establish a communication connection to the terminal; and a second sending unit, configured to send the system information of the first cell of the first base station to the terminal.

Optionally, the receiving module 1202 includes: a first receiving unit, configured to receive, by using a first uplink carrier, the uplink data sent by the first base station, where a frequency of the first uplink carrier is the same as a frequency of the uplink carrier of the first cell of the first base station.

Optionally, the receiving module 1202 includes: a second receiving unit, configured to receive, by using a second uplink carrier, the uplink data sent by the first base station, where a frequency of the second uplink carrier is the same as the frequency of the downlink carrier of the first cell of the first base station.

In this embodiment, the second base station sends the system information of the first cell of the first base station to the terminal, so that the terminal determines, by using the information about the downlink carrier of the second cell of the second base station as the downlink reference, a center frequency and a frequency bandwidth that are of the uplink carrier on which the terminal sends the uplink data in the first cell of the first base station, determines a downlink data transceiving frequency of the second cell of the second base station as the uplink data transceiving frequency between the terminal and the first base station, and determines a downlink data transceiving time of the second cell of the second base station as the uplink data transceiving time between the terminal and the first base station. The frequency of the downlink carrier of the second cell of the second base station is lower than the frequency of the downlink carrier of the first cell of the first base station, that is, the center frequency of the uplink carrier of the first cell of the first base station is lower than that of the downlink carrier of the first cell of the first base station. In addition, the uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of the high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network.

Figure 13:
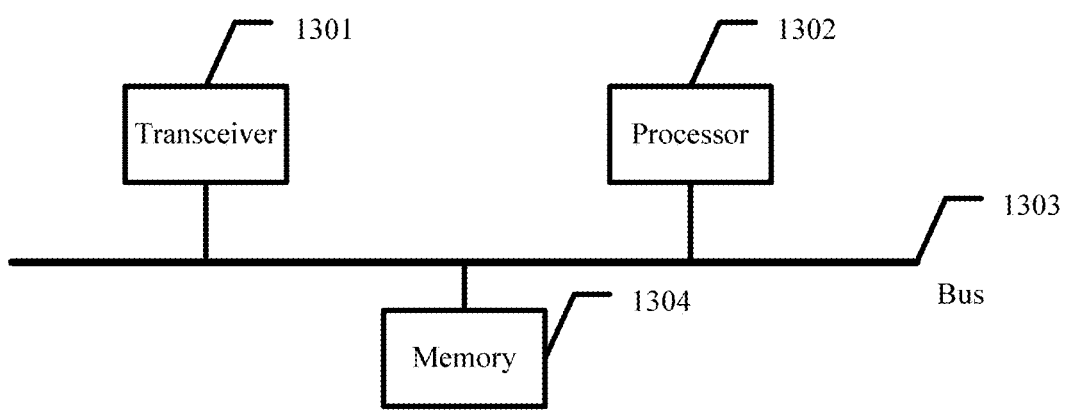
FIG. 13 is a schematic diagram of another embodiment of a second base station according to an embodiment of this application

Specifically, referring to FIG. 13, another embodiment of the second base station in the embodiments of this application includes: a transceiver 1301, a processor 1302, and a bus 1303; where the transceiver 1301 is connected to the processor 1302 by using the bus 1303.

The bus 1303 may be a peripheral component interconnect (PCI for short) bus, an extended industry standard architecture (EISA for short) bus, or the like. The bus may be classified into an address bus, a data bus, a control bus, and the like. For ease of representation, only one thick line is used to represent the bus in FIG. 13, but this does not mean that there is only one bus or only one type of bus.

The processor 1302 may be a central processing unit (CPU for short), a network processor (NP for short), or a combination of a CPU and an NP.

The processor 1302 may further include a hardware chip. The hardware chip may be an application-specific integrated circuit (ASIC for short), a programmable logic device (PLD for short), or a combination thereof. The PLD may be a complex programmable logic device (CPLD for short), a field-programmable gate array (FPGA for short), generic array logic (GAL for short), or any combination thereof.

Referring to FIG. 13, the second base station may further include a memory 1304. The memory 1304 may include a volatile memory, for example, a random access memory (RAM for short). Alternatively, the memory may include a non-volatile memory, for example, a flash memory, a hard disk drive (HDD for short), or a solid-state drive (SSD for short). Alternatively, the memory 1304 may include a combination of the foregoing types of memories.

Optionally, the memory 1304 may be further configured to store a program instruction. The processor 1302 invokes the program instruction stored in the memory 1304, and can perform one or more steps in the embodiments shown in FIG. 2 to FIG. 7, or an optional implementation in the embodiments shown in FIG. 2 to FIG. 7, to implement a function of behavior of the second base station in the foregoing method.

In this embodiment, the second base station sends system information of a first cell of a first base station to a terminal, so that the terminal determines, by using information about a downlink carrier of a second cell of the second base station as a downlink reference, a center frequency and a frequency bandwidth that are of an uplink carrier on which the terminal sends uplink data in the first cell of the first base station, determines a downlink data transceiving frequency of the second cell of the second base station as an uplink data transceiving frequency between the terminal and the first base station, and determines a downlink data transceiving time of the second cell of the second base station as an uplink data transceiving time between the terminal and the first base station. A frequency of the downlink carrier of the second cell of the second base station is lower than a frequency of a downlink carrier of the first cell of the first base station, that is, a center frequency of the uplink carrier of the first cell of the first base station is lower than that of the downlink carrier of the first cell of the first base station. In addition, an uplink time-frequency resource scheduled by the first base station for the terminal is a time-frequency resource on the uplink carrier of the first cell of the first base station. That is, a high-frequency downlink and a low-frequency uplink are implemented for data transmission between the terminal and the first base station. When uploading uplink data by using a low-frequency signal, the terminal may meet long-distance transmission, thereby increasing an uplink coverage area of the high-frequency transmission system. Further, to avoid a conflict between an uplink signal of the first cell of the first base station and an uplink signal of the second cell of the second base station, the first base station and the second base station need to coordinate a resource of the uplink carrier, for example, use the resource of the uplink carrier at different time or different frequencies through time division multiplexing (TDM) or frequency division multiplexing (FDM). The coordination may be implemented through signaling interaction between the first base station and the second base station, or may be implemented by configuring different uplink carrier resources for the first base station and the second base station by using a network.

In this application, the terms "uplink" and "downlink" are used to describe data/information transmission directions in some scenarios. For example, an "uplink" direction is a direction in which data/information is transmitted from a terminal device to a core network device, and a "downlink"

direction is a direction in which data/information is transmitted from the core network device to the terminal device. The "uplink" and the "downlink" are only used to describe directions, and a specific device on which data/information transmission starts or ends is not limited. The term "and/or" mentioned in this patent application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects. In this application, names may be assigned to various types of objects such as messages/information/devices/network elements/systems/apparatuses/actions/operations/procedures/concepts. However, these specific names do not constitute a limitation on the related objects. The assigned names may vary with a factor such as a scenario, a context, or a usage habit. An understanding of a technical meaning of a related object should be mainly determined from a function and a technical effect that are embodied/performed in a technical solution.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An apparatus, comprising:
   a communication interface circuitry; and
   at least one processor cooperating with the communication interface circuitry, the at least one processor is configured to invoke a program instruction from a memory to perform operations comprising:
      obtaining a downlink reference for uplink transmission in a first cell of a first base station, wherein the downlink reference comprises information regarding a downlink carrier of a second cell of a second base station, synchronization, in the first cell, of uplink data transceiving frequencies or uplink data transceiving times between the apparatus and the first base station is performed according to the downlink reference, frequency information of an uplink carrier of the first cell is determined according to the downlink reference, and a frequency of a downlink carrier of the first cell is higher than a frequency of the downlink carrier of the second cell;
      obtaining uplink grant information in the first cell of the first base station, wherein the uplink grant information comprises information regarding an uplink time-frequency resource on the uplink carrier of the first cell; and
      sending uplink data to the first base station on the uplink time-frequency resource using the downlink reference.

2. The apparatus according to claim 1, wherein the operations further comprise:
   obtaining system information of the first cell of the first base station, wherein the system information comprises indication information, and the indication information comprises the downlink reference.

3. The apparatus according to claim 2, wherein the operations further comprise:
   obtaining a broadcast message of the second cell of the second base station; and
   reading the broadcast message to obtain the system information of the first cell.

4. The apparatus according to claim 2, wherein the operations further comprise:
   establishing a communication connection to the second base station; and
   receiving the system information of the first cell from the second base station.

5. The apparatus according to claim 2, wherein the indication information further comprises identification information of the second cell of the second base station.

6. The apparatus according to claim 1, wherein a center frequency of the uplink carrier of the first cell is the same as a center frequency of an uplink carrier of the second cell.

7. The apparatus according to claim 1, wherein the operations further comprise:

obtaining time information, wherein the time information indicates a timing advance of a moment when the apparatus sends the uplink data relative to a start moment of the uplink time-frequency resource; and sending the uplink data to the first base station on the uplink time-frequency resource using the downlink reference and the timing advance.

8. An apparatus, comprising:

a communication interface circuitry; and at least one processor cooperating with the communication interface circuitry, the at least one processor is configured to invoke a program instruction from a memory to perform operations comprising:

establishing a communication connection to a terminal, wherein a downlink reference for uplink transmission in a first cell of the apparatus comprises information regarding a downlink carrier of a second cell of a second base station, synchronization, in the first cell, of uplink data transceiving frequencies or uplink data transceiving times between a terminal and the apparatus is performed according to the downlink reference, the information regarding an uplink carrier of the first cell is determined according to the downlink reference, and a frequency of a downlink carrier of the first cell is higher than a frequency of the downlink carrier of the second cell;

sending uplink grant information to the terminal, wherein the uplink grant information comprises information regarding an uplink time-frequency resource on the uplink carrier of the first cell; and receiving uplink data from the terminal, wherein the uplink data is sent, by the terminal to the apparatus, on the uplink time-frequency resource using the downlink reference.

9. The apparatus according to claim 8, wherein a center frequency of the uplink carrier of the first cell is the same as a center frequency of an uplink carrier of the second cell.

10. The apparatus according to claim 8, wherein the operations further comprise:

after receiving, uplink data from the terminal, sending, the uplink data to the second base station using a first uplink carrier, wherein the second base station forwards the uplink data to a core network, and wherein a frequency of the first uplink carrier is the same as a frequency of the uplink carrier of the first cell of the apparatus.

11. The apparatus according to claim 8, wherein the operations further comprise:

after receiving, uplink data from the terminal, sending, the uplink data to the second base station using a second uplink carrier, wherein the second base station forwards the uplink data to a core network, and wherein a frequency of the second uplink carrier is the same as the frequency of the downlink carrier of the first cell of the apparatus.

12. An apparatus, comprising:

a communication interface circuitry; and at least one processor cooperating with the communication interface circuitry, the at least one processor is configured to invoke a program instruction from a memory to perform operations comprising:

sending system information of a first cell of a first base station to a terminal, wherein the system information comprises indication information, the indication information comprises a downlink reference, the downlink reference comprises information regarding a downlink carrier of a second cell of the apparatus, synchronization, in the first cell, of uplink data transceiving frequencies or uplink data transceiving times between the terminal and the first base station is performed according to the downlink reference, frequency information of an uplink carrier of the first cell is determined according to the downlink reference, and a frequency of a downlink carrier of the first cell is higher than a frequency of the downlink carrier of the second cell;

receiving uplink data from the first base station, wherein the uplink data is sent from the terminal to the first base station on an uplink time-frequency resource on the uplink carrier of the first cell using the downlink reference, and the uplink time-frequency resource on the uplink carrier of the first cell is comprised in uplink grant information that is sent from the first base station to the terminal; and sending the uplink data to a core network.

13. The apparatus according to claim 12, wherein the operations further comprises:

sending a broadcast message to the terminal, wherein the broadcast message comprises the system information of the first cell of the first base station.

14. The apparatus according to claim 12, wherein the operations further comprise:

establishing a communication connection to the terminal; and sending the system information of the first cell of the first base station to the terminal.

15. The apparatus according to claim 12, wherein the operations further comprise:

receiving, using a first uplink carrier, the uplink data from the first base station, wherein a frequency of the first uplink carrier is the same as a frequency of the uplink carrier of the first cell of the first base station.

16. The apparatus according to claim 12, wherein the operations further comprise:

receiving, using a second uplink carrier, the uplink data from the first base station, wherein a frequency of the second uplink carrier is the same as the frequency of the downlink carrier of the first cell of the first base station.

17. A non-transitory computer-readable storage medium comprising an instruction, wherein when the instruction is run by at least one processor of a terminal, the at least one processor performs operations comprising:

obtaining a downlink reference for uplink transmission in a first cell of a first base station, wherein the downlink reference comprises information regarding a downlink carrier of a second cell of a second base station, synchronization, in the first cell, of uplink data transceiving frequencies or uplink data transceiving times between the terminal and the first base station is performed according to the downlink reference, frequency information of an uplink carrier of the first cell is determined according to the downlink reference, and a frequency of a downlink carrier of the first cell is higher than a frequency of the downlink carrier of the second cell;

obtaining uplink grant information in the first cell of the first base station, wherein the uplink grant information comprises information regarding an uplink time-frequency resource on the uplink carrier of the first cell; and sending uplink data to the first base station on the uplink time-frequency resource using the downlink reference.

18. The non-transitory computer-readable storage medium according to claim 17, wherein when the instruction further comprises:

obtaining system information of the first cell of the first base station, wherein the system information comprises indication information, and the indication information comprises the downlink reference.

19. The non-transitory computer-readable storage medium according to claim 18, wherein when the instruction further comprises:

obtaining a broadcast message of the second cell of the second base station; and reading the broadcast message to obtain the system information of the first cell.

20. The non-transitory computer-readable storage medium according to claim 18, wherein when the instruction further comprises:

establishing a communication connection to the second base station; and receiving the system information of the first cell from the second base station.

\* \* \* \* \*